United States Patent [19]
Masicovetere et al.

[11] Patent Number: 5,616,260
[45] Date of Patent: Apr. 1, 1997

[54] WIRE PREPARATION FOR WIRE CUTTING ELECTRO-EROSION

[75] Inventors: Roland Masicovetere, Belp; Stefano Angelella, Losone, both of Switzerland

[73] Assignee: AG Für Industrielle Elektronik, Losone, Switzerland

[21] Appl. No.: 78,370

[22] Filed: Jun. 16, 1993

[30] Foreign Application Priority Data

Jun. 16, 1992 [CH] Switzerland ............................ 4219712

[51] Int. Cl.$^6$ ....................................................... B23H 7/02
[52] U.S. Cl. ........................................................ 219/69.12
[58] Field of Search ................................ 219/69.12, 69.17

[56] References Cited

U.S. PATENT DOCUMENTS

| | | | |
|---|---|---|---|
| 4,536,632 | 8/1985 | Inoue | 219/69.12 |
| 4,872,245 | 10/1989 | Kawasaki et al. | 29/81.03 |

FOREIGN PATENT DOCUMENTS

| | | |
|---|---|---|
| 0173786 | 3/1986 | European Pat. Off. . |
| 2440564 | 3/1975 | Germany . |
| 3319935 | 12/1983 | Germany . |
| 52-020499 | 2/1977 | Japan . |
| 57-156129 | 9/1982 | Japan .................................. 219/69.12 |
| 58-211829 | 12/1983 | Japan . |
| 59-053128 | 3/1984 | Japan . |
| 62-114829 | 5/1987 | Japan . |

*Primary Examiner*—Geoffrey S. Evans
*Attorney, Agent, or Firm*—Cohen, Pontani, Lieberman, Pavane; Christa Hildebrand

[57] ABSTRACT

The apparatus (1) includes a wire-preparation (18) section upstream of the erosion point (3). Surface plating, especially with zinc, tin, and/or silver, and/or non-metal protective coating is removed from the wire while the wire is being prepared and especially while it is being cleaned and surface-treated. Substances, especially substances already present at the surface of the wire, are thermally diffused throughout that surface.

23 Claims, 1 Drawing Sheet

WIRE PREPARATION FOR WIRE CUTTING ELECTRO-EROSION

BACKGROUND OF THE INVENTION

1. Field of the Invention

The present invention concerns an apparatus for and a method of electrical-discharge machining a workpiece.

2. Description of the Prior Art

A wide range of electrical-discharge machining apparatuses and methods have long been known. Drawing an electrical-discharge wire through a calibrating die before it is introduced at an erosion point to ensure that its diameter will remain constant is known for example. Annealing, stretching, and/or quenching the tip of the wire before it is threaded through the automatic calibrating die are also known. The intention is to stiffen the tip before introducing it into a reference cavity for example.

The basic components of an electrical-discharge machining apparatus are usually a frame accommodating the drive mechanisms and wire system, a rinsing system, a spark generator, and numerical, specifically computerized numerical, controls.

The tool is a cathode in the form of a length of wire, and the workpiece constitutes an anode. The wire, commencing at a reference cavity or point of origin, carves a cavity into or out of the workpiece.

German OS 3 319 935 A1 describes how a wire in the process of eroding the material entrains air bubbles that prevent it from becoming thoroughly wet. The wire overheats locally and tends to break. To counteract this situation the wire can be brushed before it arrives at the erosion point. It can also or alternatively be sprayed from a nozzle with a liquid, purified water for example, that has been induced to oscillate by an ultrasonic generator. The purpose of the brush, nozzle, and oscillator is to clean the wire. The aforesaid document claims that such cleaning definitely augments the wettability of the moving wire. The wire will attract very little air to its surface. The overall result is a wire that is cooler at the erosion point and will not break as easily.

European Patent 0 173 786 A1 discloses increasing the efficiency of an electrical-discharge machining apparatus by cold drawing the wire to define its diameter before it arrives at the erosion point. Several dies are employed. The same document also suggests a measure for improving cold ductility and reducing breakage in a wire that is at least 50% zinc or cadmium. The wire is heated to at least 600° C. in a hot box before it enters the dies to coat it with either zinc oxide or cadmium oxide. Coating the wire makes it easier to cold draw and less likely to break, which adds up to more efficient machining.

German Patent 2 440 564 C2 discloses an electrical-discharge machining apparatus with a wire that is straightened and oriented and optionally cold calibrated before it arrives at the erosion point. The wire travels first through a heating section and then through a cooling section before arriving at the erosion point. It is calibrated by dies upstream of the heating section. The wire in one embodiment also travels through a bath of unspecified liquid before it arrives at the erosion point. The overall wire can be directly heated in the heating section by directing an electric current through it. The inner surface of the heating-section wall can be designed to reflect heat. The wire can alternatively be heated inductively, specifically with a high-frequency generator that directs current through a coil around the electrical-discharge wire. The wire is not heated enough to oxidize its surface but just hot enough to straighten and orient it.

Still, there is a constantly increasing demand for an electrical-discharge machining to erode material even more rapidly and precisely and leave a smoother surface.

SUMMARY OF THE INVENTION

The object of the present invention is more precise electrical-discharge machining.

This object is attained in accordance with the invention for an apparatus for electrical-discharge machining with a wire-preparation section upstream of the erosion point.

European Patent 0 173 786 A1 discloses increasing the efficiency of an electrical-discharge machining apparatus by cold drawing the wire to define its diameter before it arrives at the erosion point. Several dies are employed. The same document also suggests a measure for improving cold ductility and reducing breakage in a wire that is at least 50% zinc or cadmium. The wire is heated to at least 600° C. in a hot box before it enters the dies to coat it with either zinc oxide or cadmium oxide. Coating the wire makes it easier to cold draw and less likely to break, which adds up to more efficient machining.

German Patent 2 440 564 C2 discloses an electrical-discharge machining apparatus with a wire that is straightened and oriented and optionally cold calibrated before it arrives at the erosion point. The wire travels first through a heating section and then through a cooling section before arriving at the erosion point. It is calibrated by dies upstream of the heating section. The wire in one embodiment also travels through a bath of unspecified liquid before it arrives at the erosion point. The overall wire can be directly heated in the heating section by directing an electric current through it. The inner surface of the heating-section wall can be designed to reflect heat. The wire can alternatively be heated inductively, specifically with a high-frequency generator that directs current through a coil around the electrical-discharge wire. The wire is not heated enough to oxidize its surface but just hot enough to straighten and orient it.

Still, there is a constantly increasing demand for an electrical-discharge machining to abrade material even more rapidly and precisely and leave a smoother surface.

The object of the present invention is more precise electrical-discharge machining.

This object is attained in accordance with the invention for an apparatus for electrical-discharge machining with a wire-preparation section upstream of the erosion point.

The apparatus features novel characteristics. First, the upstream wire-preparation section accommodates means of thermally and/or chemically removing either surface plating, especially with zinc, tin, and/or silver, and/or non-metal protective coating from the wire. Second, the same section accommodates means of thermally diffusing substances, especially substances already present at the surface of the wire, throughout that surface.

The object is also attained in accordance with the invention for a method of electrical-discharge machining whereby the wire is prepared, especially thermally and/or chemically, before it arrives at the erosion point.

The method also features novel characteristics. First, surface plating, especially with zinc, tin, and/or silver, and/or non-metal protective coating is removed from the wire while the wire is being prepared and especially while it is being cleaned and surface-treated. Second, substances, especially substances already present at the surface of the wire, are thermally diffused throughout that surface.

Thermal and chemical preparation are uncomplicated techniques for removing surface plating, especially with zinc, tin, and/or silver, and/or an extensive range of non-metal protective coatings. Again, substances that are already present there can be thermally diffused throughout the surface of the wire.

None of the publications hereintofore cited as prior art addresses removing surface plating, especially with zinc, tin, and/or silver, and/or non-metal protective coating from the wire before it arrives at the erosion point. Any coating that is mentioned is not intended for protection.

In summary, accordingly, the present invention relates to modifying the surface of the wire for a particular purpose before the wire arrives at the erosion point. The surface of the wire can be altered and modified precisely enough in accordance with the particular treatment parameters employed, i.e. coat or plate removal or substance diffusion, to render the machining much more efficient than the state of the art.

Specific parameters can also be selected in accordance with the invention to help solve other problems that occur in electrical-discharge machining. The novel upstream wire preparation will for example accelerate the abrasion of material from the work and improve the machined surface.

The present invention exploits a feature that has so far been neglected in every attempt to improve the electrical-discharge machining process. That feature is the surface of the wire itself.

The effect of the wire's composition on how the material is eroded from the work is of course known in principle. It is for example conventional to use a wire of a metal or alloy specific to the specific material being eroded. The choice, however, always addresses matters "outside" the apparatus itself.

The concept, however, of preparing a wire of whatever composition inside the electrical-discharge machining apparatus before the wire arrives at the erosion point by modifying its surface to remove unwanted surface plating and/or non-metal protective coating and by diffusing already present substances throughout the surface is new. The diffusion occurs by the way at 500° to 900 ° C. in particular and preferably at 500° to 590° C. It is an especially practical concept in that electrical-discharge wires are not usually supplied by the manufacturer ready to use. Their core is frequently provided with a coat of diffused, sometimes incompletely diffused, zinc. The wires are often plated on top of the zinc with another 0.3 μm of metal, silver for instance, to protect them from corrosion. Silver plating is of course practical, to improve probing for example. Still, it makes sense to get rid of the silver for the actual machining because it would inhibit erosion and might contaminate the eroded surface. A new wire can also be surrounded by a protective coating. FIG. 2 illustrates a three-layer electrical-discharge machining wire. It has a core of copper-zinc 37 diffused with zinc and plated with silver.

Although attempts have been made to supply such wires in a more practical form, it has obviously been necessary up to now to accept the presence of such wires as is at the erosion point. The present invention on the other hand makes it possible for the first time to alter and modify the surface of the wire even once it is in the apparatus and while or just before it is in operation.

The invention also represents a considerable advance from the aspect of diffusion beyond strictly cleaning the wire of dirt or of interfering protective coating. Diffusion does not remove coating or surface plating from the wire but improves an already but incompletely diffused coat. Diffusion accordingly contributes in particular to improving the surface of the wire as well as to the basic object of the present invention.

The wire-preparation section in one preferred embodiment of the invention heats up essentially only the surface of the wire.

The wire-preparation section in another preferred embodiment can include means of boiling off the surface plating and/or non-metal protective coating. Evaporation by boiling off is a particularly elegant approach to removing them. The actual means can comprise a coil that heats and anneals the surface of the wire. The wire-preparation section can in the same embodiment also or alternatively include to advantage means of burning a surface plating and/or non-metal protective coating in order to carbonize it.

Further preferred embodiments of the present invention are recited in the subsidiary claims. It will be of advantage for the wire-preparation section to include a high-frequency transmitter, especially a variable-frequency transmitter, an ultrasound generator, a source of especially infrared radiation, and a spray or bath. Since there is little or no mechanical force on the wire, abrasion will not be effected by oscillation, vibration, etc.

The wire-preparation section in one particularly preferred embodiment is connected to a computer that does numerical control. It is of particular advantage in this embodiment for the computer software to include a program that controls the section in accordance with the state of the overall apparatus. This feature allows particularly interesting applications for the invention. It becomes possible for instance to vary the surface properties of the wire to comply with the erosion parameters and to combine various operating functions as desired.

One version of the electrical-discharge machining method in accordance with the invention has been demonstrated particularly practical. The computer in this version ensures that the wire-preparation section will only burn dirt off during the probing stage, will carry out various surface cleaning-and/or-treatment processes during the erosion stage, and will turn off during the program-check stage. This procedure provides simple ensurance that the wire preparation will not keep operating unnecessarily or even disrupt threading.

BRIEF DESCRIPTION OF THE DRAWING

A preferred embodiment of the invention will now be specified by way of example with reference to the schematic drawings.

DESCRIPTION OF PREFERRED EMBODIMENTS

Figure 1:
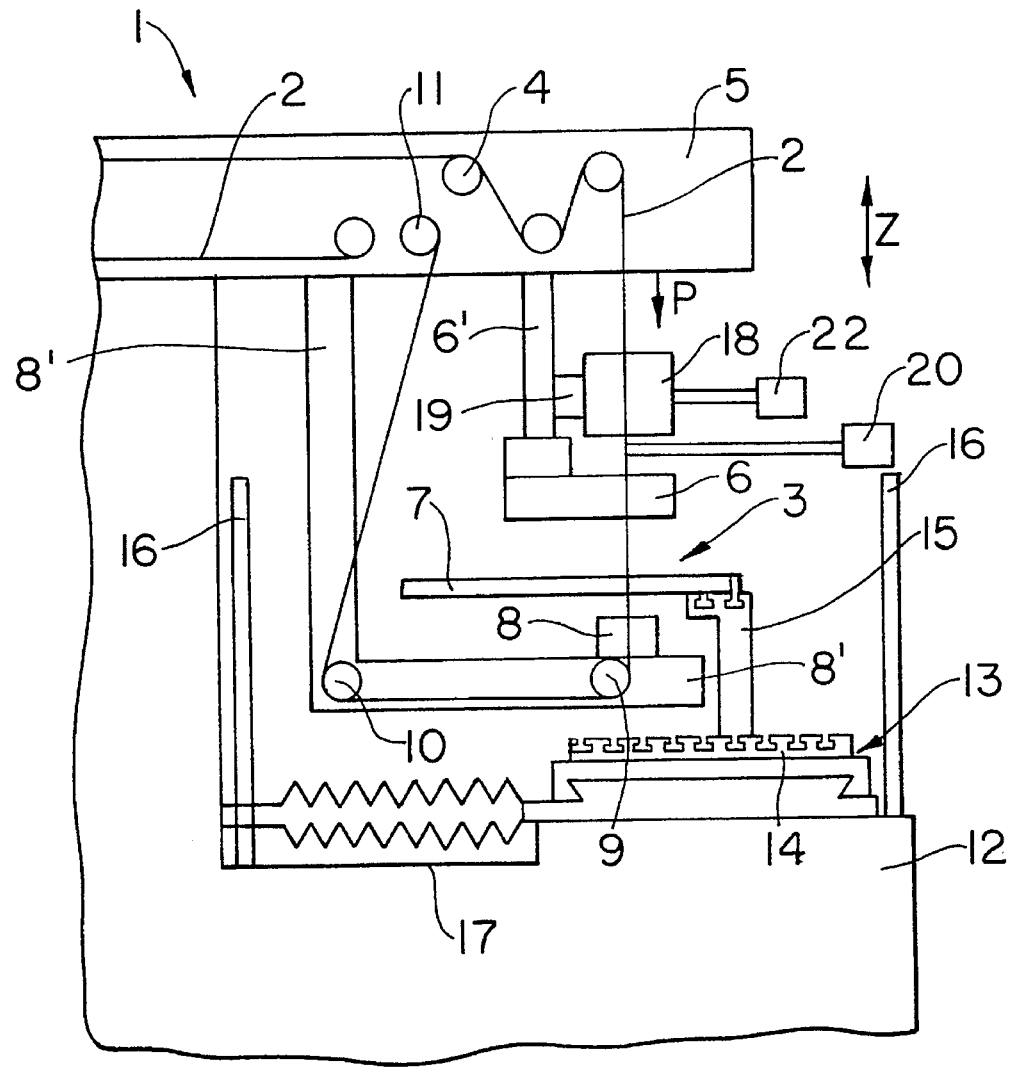
FIG. 1 is a view of an electrical-discharge machining apparatus in accordance with the present invention.

FIG. 1 will now be described in terms intended to contribute to comprehension of the invention without limiting it in any way. The terms "top," "bottom," "narrower," and "wider" for example refer to machines of conventional design and dimensions and to conventionally mounted work.

FIG. 1 illustrates an electrical-discharge machining apparatus 1, which is equipment that shapes or otherwise processes workpieces by using an electric spark to abrade material from it. FIG. 1 is restricted for simplicity's sake to representing only the components of the apparatus that concern the invention. Such conventional components as rinsers, generators, and computers are considered in themselves known and accordingly not illustrated.

A cathode in the form of a length of wire 2 is, as is conventional, unrolled from an unillustrated supply reel. Wire 2 is drawn through the C-shaped apparatus by a wire-advance mechanism. The wire is positioned as it enters at the top by pulleys 4 secured to the outside of the upper arm 5 of the C. The wire is next drawn essentially straight down in the direction indicated by arrow P and through a vertical perforation in a guide 6. The position of guide 6 can be adjusted in the U-V plane on a holder 6' that descends from upper arm 5. Wire guide 6 accommodates such conventional components as a source of electric pulses 20, a wire channel, and a sprayer. The sprayer terminates in a nozzle that sprays the wire with the liquid dielectric necessary to the process. Thorough wetting ensures such constant and well defined electric parameters as ionization, cooling, rinsing away the eroded-off particles, etc. The wire now arrives at an erosion point 3 at the surface of work 7.

Leaving work 7, wire 2 travels through another wire guide 8 similar in design to upper wire guide 6 and mounted on an L-shaped holder 8'. Pulleys 9 and 10 on lower wire-guide holder 8' and pulleys 11 on upper arm 5, finally, guide the wire as it travels on to an unillustrated used-wire receptacle.

The wire-guide holders 6' and 8' illustrated in FIG. 1 are secured along with wire guides 6 and 8 to the upper arm 5 of apparatus 1.

Wire 2 is tensioned more or less vertical between arm 5 and lower wire guide 8 during the electrical-discharge machining process. Upper wire guide 6 can be exploited to additionally tension the wire and to precisely position its end above work 7.

The lower arm of C-shaped apparatus 1 is constituted by a bench 12. Resting on bench 12 is a Cartesian-translation carriage 13 that can be displaced horizontally in an X direction and in a Y direction. Resting on carriage 13 is a workpiece holder 14. Mounted on workpiece holder 14 is a vise 15 that secures and positions workpiece 7. Workpiece 7 is electrical-discharge machined between upper wire guide 6 and lower wire guide 8.

Erosion point 3 is essentially demarcated by walls 16 and a bottom 17. The walls and bottom in conjunction constitute an enclosure with an open top.

From the foregoing description it will be evident that the overall equipment and procedure in accordance with the invention is no more complicated for the operator or observer than the conventional. There is one essential difference in accordance with the invention, however. The wire, specifically, travels upstream of work 7 and in the present embodiment even upstream of upper wire guide 6 through an innovatively designed section 18 wherein it is specially prepared by cleaning and surface treatment.

Wire-preparation section 18, which is illustrated highly schematically in FIG. 1, is secured at an appropriate level above upper wire-guide holder 6' by a horizontal support 19. It could of course just as well be positioned immediately downstream of the unillustrated reel of wire or in the vicinity of the pulleys, and many simple solutions for designing and streaming the apparatus will occur to one of skill in the art.

Wire 2 is subjected in wire-preparation section 18 to thermal and chemical treatment to modify and improve its surface before it arrives at erosion point 3.

Figure 2:
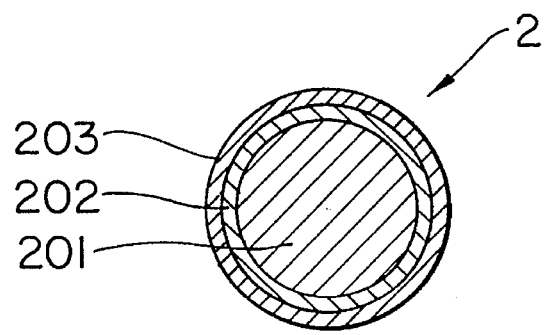
FIG. 2 is a cross-section through a known erosion wire.

FIG. 2 is a section through a conventional wire 2 as hereintofore described. It consists of a core 201 of copper-zinc 37 alloy and a diffused-on layer 202 of zinc plated with silver 203. The wire can also be covered with a protective coating and dirt (both unillustrated).

Simultaneously or consecutively the dirt is burned off, surface plating 202, silver in the present case, and/or the non-metal protective coating are boiled off, and the remaining layer 202, of zinc in the present case, is thermally diffused into the core.

One of the major advantages of the present invention is the facility with which the often undesirable silver is removed.

One particularly ingenious innovation of the invention is that the wire does not need to be heated all the way through. Such brief treatments as shock heating and, of particular advantage, high-frequency heating of the skin alone are appropriate for removing the metal. Heating the surface plating will accordingly also indirectly boil off the non-metal protective coatings. It turns out to be practical to be able to vary the frequency of the inductive alternating field. Frequency, that is, is a means of controlling the depth to which the field will penetrate into and accordingly heat the wire. An appropriate frequency will even make it possible to precisely synchronize boiling off the silver and augmenting the level of zinc in a single heating procedure. Since the wire heats up only at the surface, cooling is unnecessary, although it will accelerate the escape of heat. The liquid dielectric conventionally employed to rinse and cool the wire is a particular advantage here in that it is much less conductive than the wire. High-frequency heating will accordingly induce no current in it even though it is in contact with the wire, constituting in a way its outermost surface. It will accordingly not warm up when exposed to the high frequency and will retain its entire cooling capacity.

Wire-preparation section 18 can be connected to a computer 22 by, making it possible to numerically control the section manually or automatically. It is sensible for instance just to burn of the dirt during the probing stage and to exploit all the wire-preparation section's functions only during the actual erosion stage. Another sensible feature is that the section can be disengaged for a program check.

We claim:

1. An apparatus for electrical-discharge machining of a workpiece, including a wire electrode guide and power delivery circuit, comprising a wire electrode having at least one protective coating;

a wire-preparation section positioned upstream of the workpiece; and wherein the wire preparation section accommodates at least one of a means for thermal removal, chemical removal and thermal diffusion of the at least one protective coating.

2. The apparatus as in claim 1, wherein the wire-preparation section includes heating only one of the at least one coating.

3. The apparatus as in claim 1, wherein the wire preparation section includes means for boiling off the at least one coating.

4. The apparatus as in claim 1, wherein the wire-preparation section includes means for burning by carbonizing the at least one coating.

5. The apparatus as in claim 1, further comprising a computer, and wherein the computer is connected to the wire preparation section for numerical control.

6. The apparatus as in claim 5, wherein the computer having software for controlling the wire-preparation section in accordance with overall electric-discharge machining.

7. The apparatus as in claim 1, further comprising at least one of a wire-guide for guiding the wire electrode and a current source for supplying current to the wire electrode, and wherein the wire-preparation section is disposed upstream of the at least one of the wire-guide and the current source.

8. The apparatus as in claim 1, wherein the coating is a metallic surface plating.

9. The apparatus as in claim 8, wherein the metallic surface plating is selected from the group consisting of zinc, tin and silver.

10. The apparatus as in claim 1, wherein the coating is a non-metal protective coating.

11. A method of electro-erosive machining a workpiece with a wire electrode having at least one protective coating, comprising the steps of:

supplying the wire electrode through a wire guide for cutting a workpiece;

removing from the wire electrode one of the at least one protective coating by at least one of a means for thermal removal, thermal diffusion and chemical removal;

forwarding the wire electrode to the workpiece for electro-erosive machining.

12. The method as in claim 11 further comprising a step of subjecting the wire electrode to ultrasound.

13. The method as in claim 11, wherein the removal step by thermal diffusion includes heating the wire surface for evaporating the surface layer.

14. The method as in claim 11, wherein the removal step by thermal diffusion includes carbonizing the wire coating.

15. The method as in claim 11, further comprising a step of subjecting the wire electrode to a high-frequency field.

16. The method as in claim 15, wherein the frequency of the field is being varied.

17. The method as in claim 11, further comprising a step of subjecting the wire electrode to infrared radiation.

18. The method as in claim 11, further comprising a step of subjecting the wire electrode to a spray.

19. The method as in claim 18, wherein the spray is gas.

20. The method as in claim 11, further comprising a step of subjecting the wire electrode to a bath.

21. The method as in claim 11, further comprising a step of providing at least one of a wire-guide and a current source for supplying current to the wire electrode after the removal step.

22. A method of electro-erosive machining a workpiece with a wire electrode having a protective coating of at least one of a metallic layer and non-metallic layer, comprising the steps of:

providing the wire electrode guided by a wire guide;

providing a wire preparation section for removing from the wire electrode the protective coating;

providing a computer using numerical control for controlling the removal in the wire preparation section;

forwarding the wire electrode to the workpiece for electro-erosive machining.

23. The method as in claim 22 further comprising the coating removal step occurs during the electro-erosive machining, and wherein the numerical control also provides a program check while the numerical control for the wire-preparation section is turned off.

* * * * *